United States Patent [19]
Langner et al.

[11] Patent Number: 5,190,107
[45] Date of Patent: Mar. 2, 1993

[54] HEAVE COMPENSATED SUPPORT SYSTEM FOR POSITIONING SUBSEA WORK PACKAGES

[75] Inventors: Carl G. Langner, Spring; Frans Kopp, Houston, both of Tex.

[73] Assignee: Shell Oil Company, Houston, Tex.

[21] Appl. No.: 853,332

[22] Filed: Mar. 13, 1992

Related U.S. Application Data

[63] Continuation of Ser. No. 690,200, Apr. 23, 1991.

[51] Int. Cl.$^5$ ............................................. E21B 7/12
[52] U.S. Cl. ..................................... 166/355; 405/209; 441/3
[58] Field of Search ................... 166/343, 355; 175/27; 405/209, 224; 441/3, 28

[56] References Cited

U.S. PATENT DOCUMENTS

| | | | |
|---|---|---|---|
| 3,592,014 | 7/1971 | Brown | 166/343 X |
| 3,991,837 | 11/1976 | Crickmer | 175/27 X |
| 4,075,862 | 2/1978 | Ames | 166/343 X |
| 4,277,202 | 7/1981 | Archamhand et al. | 166/343 X |
| 4,279,543 | 7/1981 | Remery | 441/3 X |
| 4,459,931 | 7/1984 | Glidden | 405/224 X |
| 4,557,697 | 10/1985 | Kontar et al. | 441/28 X |
| 4,648,848 | 3/1987 | Busch | 441/5 |
| 4,793,737 | 12/1988 | Shotbolt | 166/343 X |
| 4,828,430 | 5/1989 | Vander Heyden | 405/209 |

OTHER PUBLICATIONS

"Deepwater Pipeline Repair Methods" by R. R. Ayers, Introduction and Summary, Shell Development Co., Nov. 10, 1988.

"Deepwater Pipeline Repair Methods, Method Summaries" by C. G. Langner, Proposal Presentation Mtg., Nov. 10, 1988, Shell Dev. Co.

"Deepwater Pipeline Repair Methods, Recent Test Experience" by F. Kopp Proposal Presentation Mtg., Nov. 10, 1988, Shell Development Co.

"Diverless Buckle Recovery System for Shell 12" Bullwinkle Pipeline Installation, F. Kopp, R. K. Jefferies, 8th Intnl Conf. Mar. 1989.

Agreement Between Shell Development Co. & Participating Companies for Research Program on Deepwater Pipeline Repair Methods, Dec. 6, 1988.

"Deepwater Pipeline Repair Methods", vol. 1, Shell Development Co. Houston, Tex., Jan., 1990.

"Second Generation Diverless Buckle Recovery Tools for Shell's 12" Bullwinkle Gas Pipeline Installation, Apr. 23-24, 1991, API Conf.

*Primary Examiner*—Terry Lee Melius
*Assistant Examiner*—Frank S. Tsay
*Attorney, Agent, or Firm*—Mark A. Smith

[57] ABSTRACT

A heave compensating support system is disclosed for positioning a subsea work package. The present invention provides a subsurface buoy with a lift line connected to the subsea work package and a compensating lift line having a catenary loop below its connection to the subsurface buoy on one end and connected to a surface vessel on the other end, whereby the heave compensating support system elements cooperate to establish a natural frequency for the suspended subsea work package which materially differs from the average wave frequency acting upon the surface vessel.

18 Claims, 5 Drawing Sheets

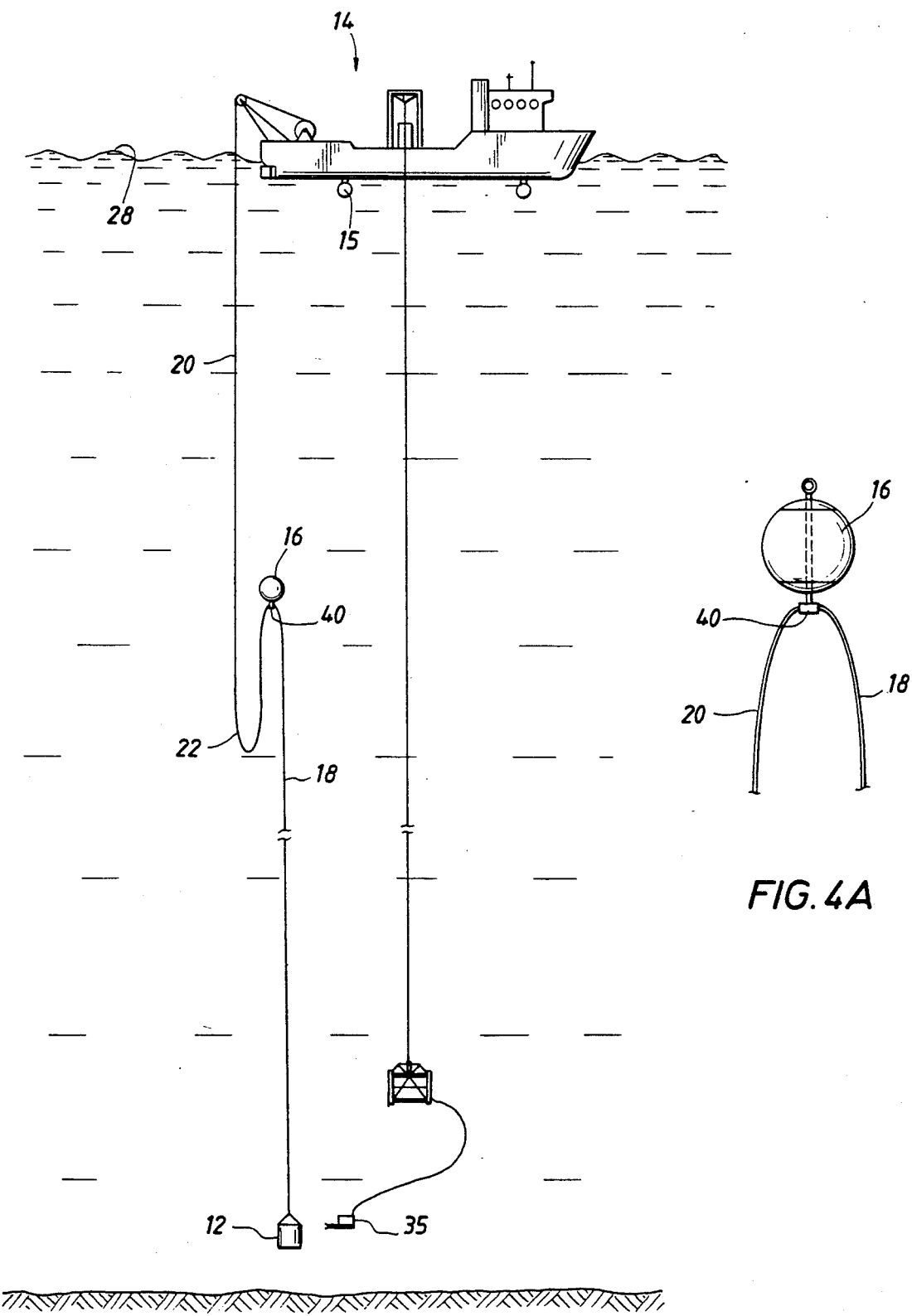

HEAVE COMPENSATED SUPPORT SYSTEM FOR POSITIONING SUBSEA WORK PACKAGES

This is a continuation of application Ser. No. 690,200, filed Apr. 23, 1991.

BACKGROUND OF THE INVENTION

This invention relates to a method and system for positioning subsea work packages and, more particularly, to a method and system for directing placement of large subsea work packages in offshore applications with a direct line from a surface vessel which is subject to wave action.

Effective placement of large subsea work packages are increasingly necessary for meeting the challenges of the deepwater environment. Representative applications include carrying and placing maintenance equipment and/or replaceable modules such as control pods onto subsea completion facilities for oil and gas wells, maintaining and repairing pipelines, and retrieving previously placed subsea components. As the need for new sources of oil and gas push operations into deeper water, such operations will increasingly require exacting placement of work packages 2,000 feet or more below the ocean's surface.

The size and mass of the subsea work package renders placement by divers very difficult, and the water depth in many applications absolutely precludes the use of divers. Similarly, the size and mass of many work packages precludes direct placement with free swimming remotely operated vehicles (ROVs). Buoyancy modules might assist ROV operations, but the mass of the work packages and the size of the their required buoyancy may nevertheless preclude primary positioning operations with ROVs.

Directly lowering the subsea work package from a surface vessel on cables or other lines is well suited to accommodate the size and mass of large work packages. However, normal sea conditions subject the vessel to heave, thereby causing the vessel to fall and rise with the passing waves. Absent an effective active heave compensation system, the vessel's motion is transmitted directly through the line to the subsea work package. This uncontrolled vertical motion proves unsatisfactory for many applications and has prevented final efforts by either divers or ROVs to guide and land the subsea work packages so presented.

Attempts have been made to dynamically compensate for the heave at the line, either by driving hydraulic rams or by driving a winch as necessary to take in or pay out line to maintain the subsea work package substantially stationary despite movement of the vessel. However, such systems are expensive, complex, subject to substantial maintenance requirements and require delicate balance to operate effectively.

Therefore, there remains a substantial need for a solution to the problem of placing subsea work packages which is simple, straightforward, and otherwise suitable for real application in the offshore working environment.

SUMMARY OF THE INVENTION

It is an object of the present invention to provide a dependable, economic system for placing subsea work packages from a surface vessel.

It is a further object of the present invention to provide an improved method and system for placing subsea work packages in direct control of a surface vessel but isolated from the heave response of the surface vessel.

Toward the fulfillment of these and other objects, a heave compensating support system for positioning a subsea work package in accordance with the present invention provides a subsurface buoy with a lift line connected to the subsea work package and a compensating lift line having a catenary loop below its connection to the subsurface buoy on one end and connected to a surface vessel on the other end, whereby the heave compensating support system elements cooperate to establish a natural frequency for the suspended subsea work package which materially differs from the average wave frequency acting upon the surface vessel.

A method for positioning a subsea work package in deepwater offshore environments in accordance with the present invention provides for suspending the subsea work package on a lift line attached to a subsurface buoy which is connected to a surface vessel through a compensating lift line having one end connected to the control equipment on the surface vessel and the other end supported by the subsurface buoy, isolating the subsea work package from the heave displacement experienced by the surface vessel by providing a catenary loop below the subsurface buoy in the compensating lift line, and isolating the subsea work package from the indirect effects of heave on the surface vessel by establishing a natural frequency of the subsea work package in the heave compensating system which substantially differs from the average wave frequency acting on the surface vessel.

BRIEF DESCRIPTION OF THE DRAWINGS

The brief description above, as well as further objects, features, and advantages of the present invention will be more fully appreciated by reference to the following detailed description of the preferred embodiments which should be read in conjunction with the accompanying drawings in which:

FIG. 4 is a side elevation view of an alternate embodiment of the present invention in which a compensating lift line is used without chain;

FIG. 4A is a side elevation, close-up view of the connection between the compensating lift line, and subsurface buoy of FIG. 4;

DESCRIPTION OF THE PREFERRED EMBODIMENT

Figure 1:
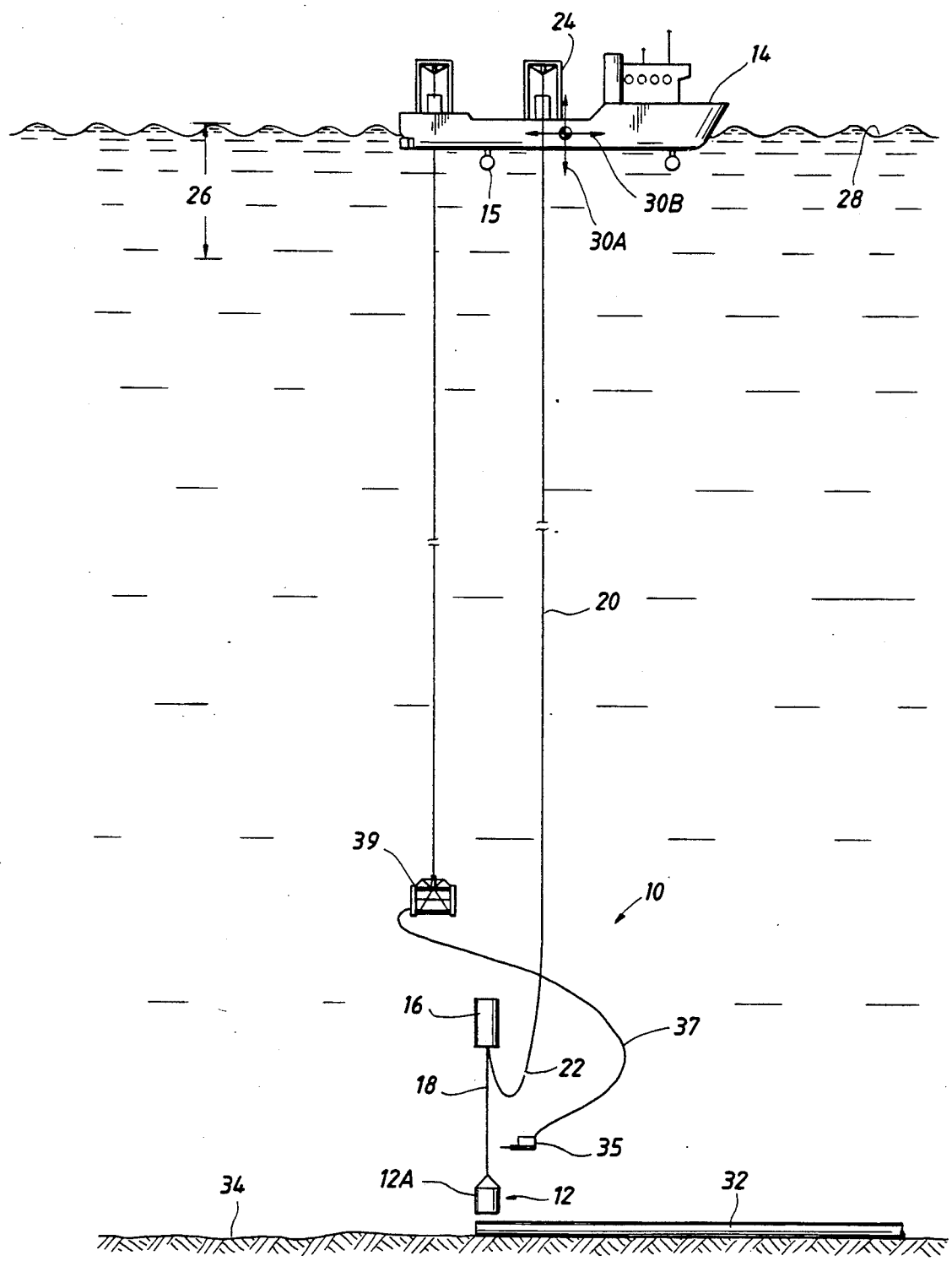
FIG. 1 is a side elevation view of a heave compensating support system for positioning a subsea work package from a surface vessel in accordance with the present invention.

FIG. 1 generally illustrates a heave compensating support system 10 for positioning a subsea work package 12 from a surface vessel 14 such as a work boat, barge, drill ship, or semisubmersible vessel. Subsea work package 12 is suspended from a subsurface buoy 16 within the heave compensating support system by a lift line 18. The subsurface buoy is suspended below wave zone 26 which is affected by the waves at surface 28. A compensating lift line 20 provides a catenary loop 22 below subsurface buoy 16 to which one end is connected and its other end is connected to control equipment 24 such as a winch or draw works on the surface vessel.

The wave forces driving the vessel's heave and surge response are indicated by arrows 30A and B, respectively. The vessel is also affected by sway causing lateral displacement. Dynamic positioning systems such as thrusters 15 may help some with surge and sway but the primary motion of heave is largely unabated.

In this illustration, subsea work package 12 is a pipeline recovery tool 12A which must be brought close and steady to pipeline 32 at seafloor 34. In position, the pipeline recovery tool 12A engages the pipe with the help of remotely operated vehicle (ROV) 35 which swims on umbilical 37 from a cage 39 which can conveniently be deployed from surface vessel 14.

This application is illustrative only and those skilled in the art can readily apply the teachings of the specification to provide an appropriate subsea work package for a wide range of deep water offshore applications including, but not limited to, carrying and placing maintenance equipment and/or replaceable modules such as control pods onto completion facilities for oil and gas wells, performing other pipeline repair and maintenance operations, and retrieving previously placed subsea equipment.

Figure 2:
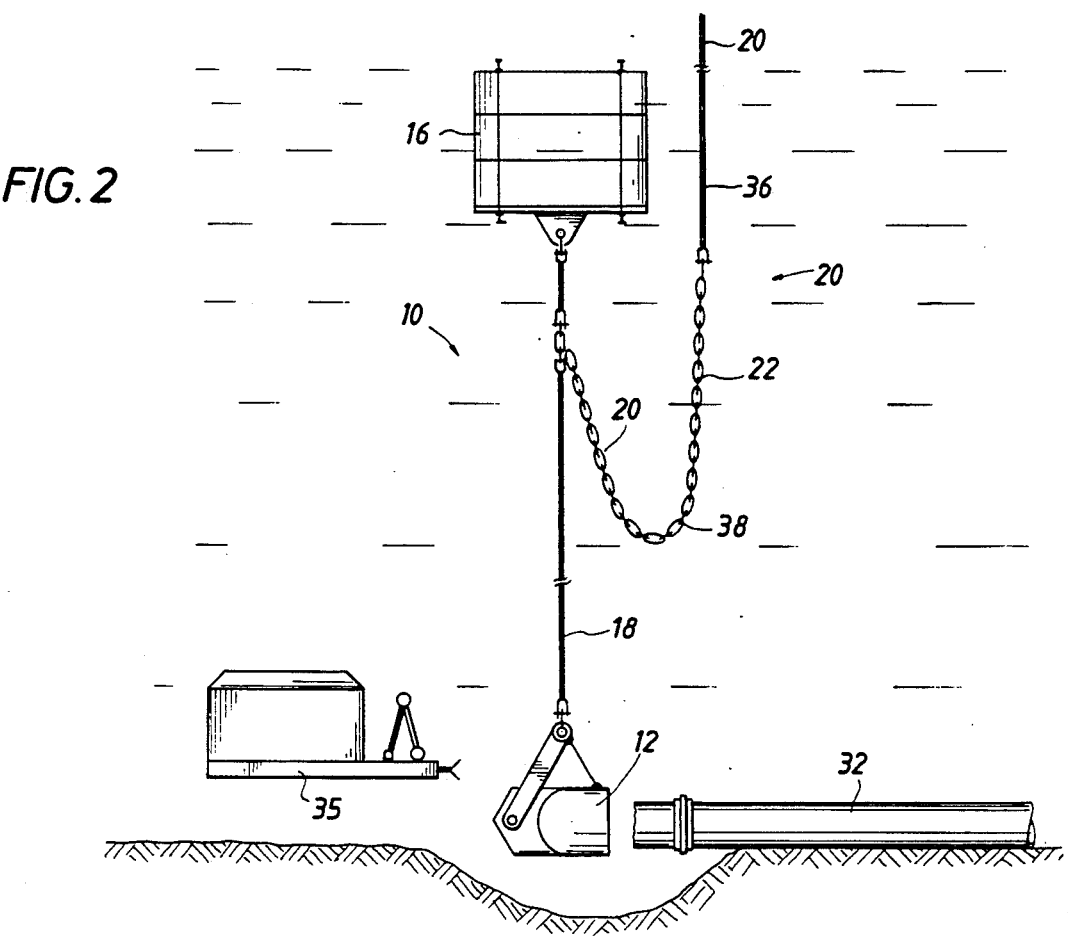
FIG. 2 is a side elevation view of the subsea components of the heave compensating support system of the present invention.

FIG. 2 is a more detailed view of the preferred embodiment of heave compensating system 10. In the preferred embodiment, compensating lift line 20 comprises a recovery cable 36 which is easily spooled onto a winch or other control equipment on the surface vessel and a chain 38 which forms the catenary loop 22. The weight of the catenary loop is shared between the subsurface buoy 16 and the surface vessel and the depth of the subsurface buoy is controllable through the recovery cable by choosing a material for the catenary loop which has significant weight with respect to the interconnected submersible buoy 16, lift line 18 and the subsea work package 12. Thus, paying out the recovery cable from the winch on the surface vessel lowers chain 38, shifting the catenary loop 22 to provide a greater load on subsurface buoy 16 and thereby causing the buoy to fall to equalize the load. This natural tendency for the catenary loop to seek and attain equilibrium allows controlled lowering of the subsea work package with the compensated lift line. The relatively heavy weight of chain therefore makes it a useful material for the catenary loop. The chain is also a useful material in that it does not exhibit the tendency of spiral-wound wire rope cable to tangle upon itself when forming a tight catenary loop.

In this embodiment, subsurface buoy 16 is provided in relatively close proximity to work package 12, also illustrated as a pipeline recovery tool. This allows use of a shorter lift line 18 which reduces the load on the bouy and also increases the sensitivity of the bouy to manipulations through recovery cable 36 by increasing the relative weight of catenary loop 22 to the total load carried by subsurface buoy 16. Thus, there is an impetus to shorten lift line 18 but the length should nevertheless be sufficient to maintain subsea work package 12 a sufficient distance below the buoy that catenary loop 22 will not interfere with the work package.

In accordance with these benefits, it is generally preferred in deepwater applications that the length of recovery line 36 at deployment be at least four times the length of lift line 18 connecting subsea work package 12 to buoy 16.

Shortening the lift line within such limits does reduce the load on subsurface buoy 16, but also places the buoy at greater depths and this in turn requires the buoy to withstand greater pressures. Syntactic foam provides an appropriate material for deployment of such buoys in deep water applications.

Thus, the heave compensating support system of the present invention may be used to position subsea work package 12 using compensating lift line 20 from surface vessel 14, as shown in FIG. 1. However, this same line will transmit the heave, sway, and surge response of vessel 14 toward subsea work package 12.

The present invention isolates the subsea work package from the surface vessel's response to wave action. First, catenary loop 22 is designed sufficiently long to absorb any rise of the surface vessel in response to wave action. That is, the catenary loop is long enough to absorb any amplitude of wave action affecting the vessel at the surface without consuming all of the slack at the catenary loop in the compensating lift line. The catenary loop also absorbs surge and sway. To assure these functions, it is preferred that the catenary loop have a length of at least three times the average wave height, requiring chain 38 to have a length of at least six times the average wave height.

Despite this isolation of direct motion, the shifting of catenary loop 22 with vertical motion in the compensating lift line will cause a shift in the load from the catenary loop to and away from subsurface buoy 16 in a manner similar to that discussed above. However, this load variance is cyclic with the wave action and the subsurface buoy/lift line/subsea work package/compensating lift line elements can be designed to be nonresponsive to cyclic input at the frequency caused by normal wave action.

Figure 3:
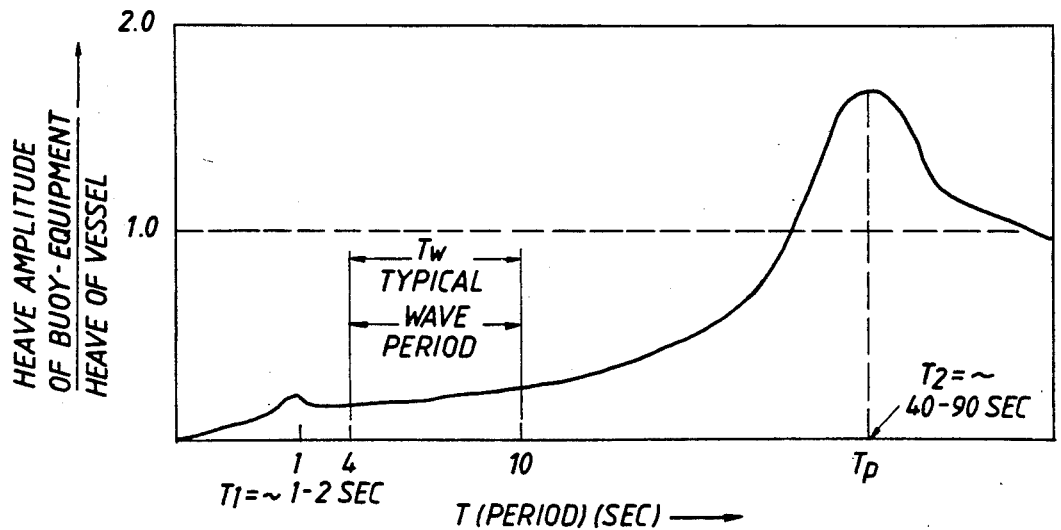
FIG. 3 is a plot of the dynamic response of the heave compensating support system for the present invention to cyclic loading.

The frequency spectrum of the wave action at the surface is empirically developed over time for a site or selected representative site. This wave action is expressed as the average period between waves by common convention. For instance, representative studies in deep water Gulf of Mexico applications typically have a wave period of between 4 and 10 seconds. This range of typical wave periods is illustrated as band $T_w$ on the plot of heave amplitude to period in FIG. 3. The curve in FIG. 3 represents the dynamic response of a heave compensating support system in accordance with the present invention.

The natural period for the response of the subsea work package $T_p$ can be approximated with the following formula in instances where the catenary loop (equilibrium position) has a constant weight per unit length:

$$T_p = 2\Pi \sqrt{\frac{M_1 + M_2}{K}}$$

where
 K=submerged weight per unit length of compensating lift line;

$M_1$ = mass of subsurface buoy + ⅓ (mass of compensating lift line)

$M_2$ = mass of subsea work package + ⅓ (mass of the lift line).

It is preferred that the natural period for the heave compensated support system be in the range of 40 to 90 seconds which can be achieved by selecting appropriate properties for the subsea work package, subsurface buoy, compensating lift line and lift line. Using the foregoing simplified approximation, and designing for a natural period in the subsea work package which is four times that of the significant wave period, components are preferably selected such that:

$$\frac{M_1 + M_2}{K} > 0.4 \, T_w^2$$

where:

$K$, $M_1$, and $M_2$ are defined as above, and $T_w$ is the significant wave period. Please again refer to FIG. 3.

It should be noted that $T_p$ is the second natural period of the heave compensating support system, the first which is a function of system response to axial vibration of the lift line proves to be of negligible impact in the overall system as noted by the amplitude of $T_1$ in FIG. 3. Nevertheless, this period can be selected in one- to two-second range which will also avoid the typical wave frequencies in which the period between waves $T_w$ is four to ten seconds.

FIG. 4 is an alternate embodiment of the present invention in which the compensating lift line, including the catenary loop, are formed from a single cable upon which a subsurface buoy 16 is clamped. See also FIG. 4A detailing clamp 40 securing this connection.

Figures 5A, 5B:
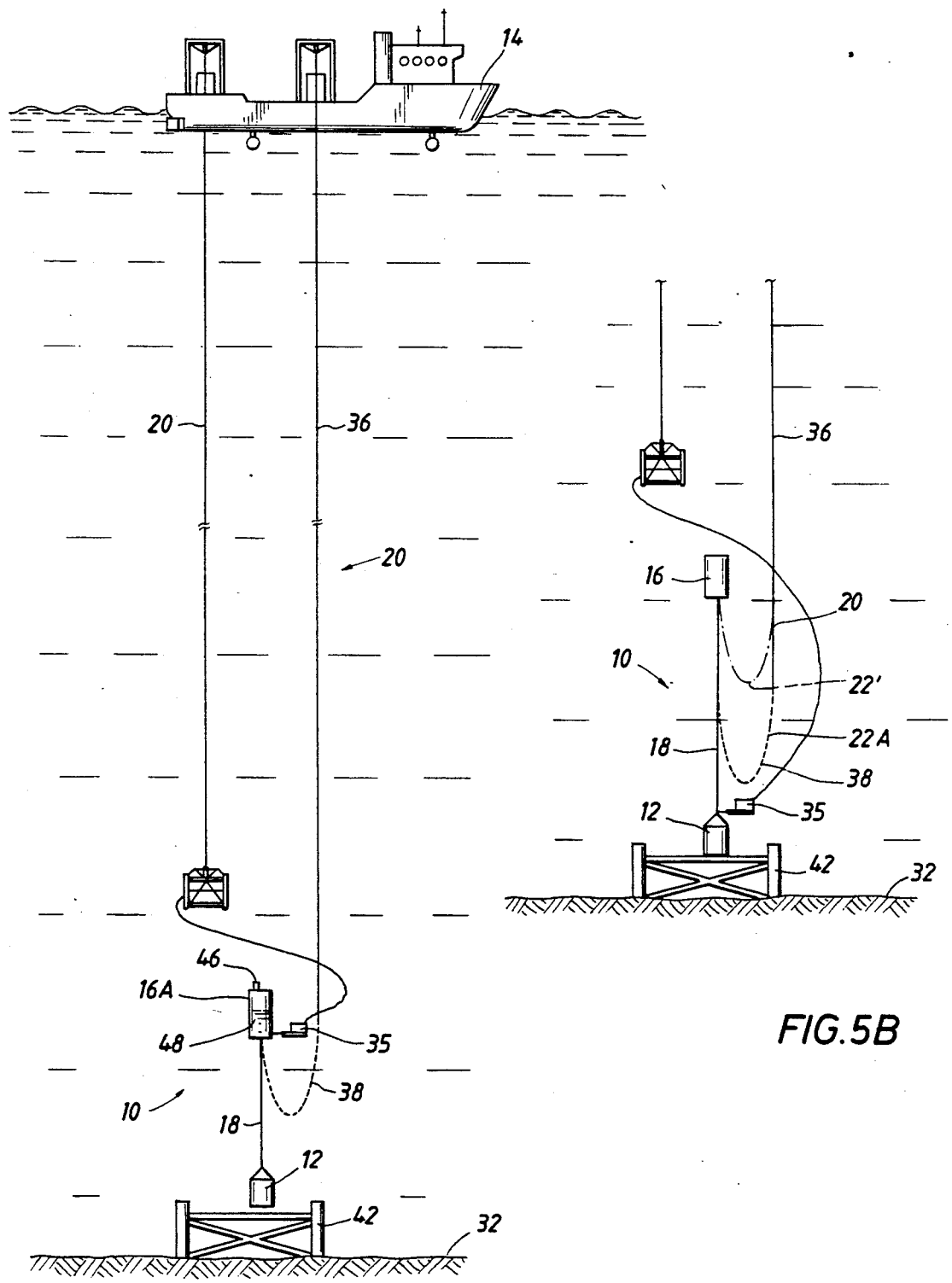
FIGS. 5A–5C are side elevation views of alternate embodiments of a heave compensated support system in accordance with the present invention in which subsea work packages are being installed and left on the ocean floor or subsea template.
Figure 5C:
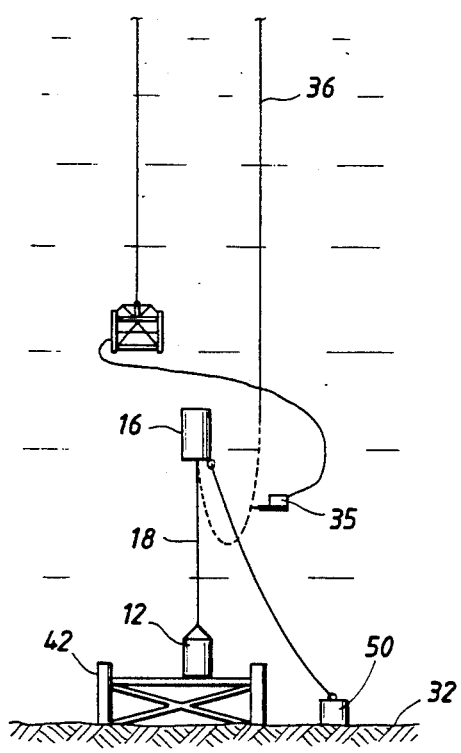

FIGS. 5A through 5C illustrate the use of a heave compensated support system in accordance with the present invention in which the application requires that substantial mass in the subsea work package be deposited at subsea surface and that the buoy and remaining equipment be retrieved.

FIG. 5A illustrates an application in which subsea work package 12 has been placed on a subsea template 42 and is to be released from the support of buoy 16A. However, instantaneous release of the load would cause the buoy to rise until the weight of the catenary loop 22 equaled the buoyancy of the buoy. Without other accommodations, this would cause recovery cable 36 of the preferred embodiment to double upon itself in the catenary loop, likely causing entanglement in the spiral-wound wire rope line. In this instance, ROV 35 is actuating a valve assembly causing the buoy to open at vent 46 to take on ballast 48 illustrated within a cross sectional view of buoy 16A. Ballast is taken on until the buoy and attached lines are neutrally buoyant absent the load and the system is retrieved.

FIGS. 5B and 5C illustrate other alternatives. In FIG. 5B the length of chain 38 exceeds the requirements of catenary loop 22' of fully loaded heave compensating support system 10. However, after placement of work package 12, the compensating lift line is payed out further until the load from catenary loop 22A on buoy 16 equals the submerged weight of the work package which is then fully transferred to template 42. Release of the work package will then not change the equilibrium of the heave compensated support system during retrieval.

FIG. 5C illustrates the use of ROV 35 to attach a clump weight 50 to the subsurface buoy before release.

Figure 6:
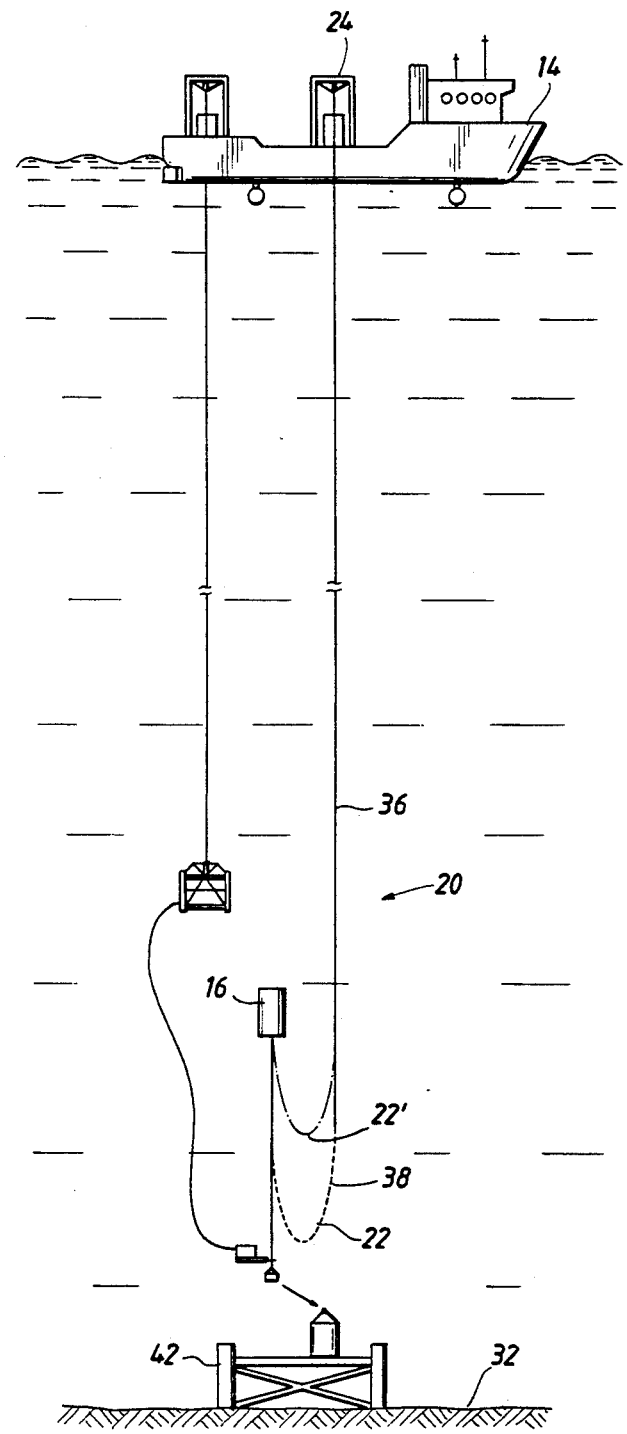
FIG. 6 illustrates use of a heave compensated support system in accordance with the present invention to retrieve subsea work packages.

FIG. 6 illustrates the retrieval of a subsea work package where the heave compensated support system 10 is deployed from surface vessel 14 with material in compensating lift line 20 to load buoy 16 with a greater catenary loop 22. After ROV 35 connects lift line 18 to subsea work package 12, the excess load of catenary loop 22 is spooled up on the surface to place the heave compensated support system, supporting the work package, into equilibrium with a reduced catenary loop 22' during ascent. Similarly, the deployment methods of FIGS. 5A and 5C can be reversed for retrieval operations by blowing ballast from the buoy or by first carrying down a clump weight connected to the buoy and then later releasing the clump, respectively.

Other modifications, changes and substitutions are intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A heave compensating support system for positioning a subsea work package from a surface vessel, said system comprising:

a subsurface buoy;

a lift line connecting the subsea work package to the subsurface buoy; and a compensating lift line having a catenary loop below the subsurface buoy, the compensating lift line being supported by the subsurface buoy on one end and connected to the surface vessel on the other end, the subsea work package, subsurface buoy, lift line and compensating lift line cooperating to establish a natural frequency for the suspended subsea work package which is materially different from the average wave frequency acting on the surface vessel.

2. A heave compensating support system in accordance with claim 1 wherein the length of the catenary loop of the compensating lift line is at least three times the average wave height.

3. A heave compensating support system in accordance with claim 2 wherein the catenary loop of the compensating lift line is formed by a chain.

4. A heave compensating support system in accordance with claim 3 wherein the compensating lift line above the catenary loop is formed by a cable connecting the chain to a winch on the surface vessel.

5. A heave compensating support system in accordance with claim 4 wherein the natural period of the heave compensating system is at least four times the average wave period experienced at the surface.

6. A heave compensating support system in accordance with claim 3 wherein $$\frac{M_1 + M_2}{K} > 0.4 \, T_w^2$$

wherein the compensating lift line has a submerged weight/unit length of $K$;

$M_1$ is the mass of the submerged buoy + ⅓ times the mass of the compensating lift line;

$M_2$ is the mass of the subsea work package $+\frac{1}{3}$ times the mass of the lift line; and $T_w$ is the significant wave period.

7. A heave compensating support system for positioning subsea work packages from a surface vessel interacting with waves having an average height and frequency, said system comprising:

a subsurface buoy;

a lift line connecting the subsea work package to the subsurface buoy;

a compensating lift line supported by the subsurface buoy on one end and connected to the surface vessel on the other end, comprising:

a chain forming a catenary loop below the subsurface buoy having a loop length which is at least three times the average wave height; and a recovery cable connecting the chain to a winch on the surface vessel;

the subsea work package, subsurface buoy, lift line and compensating lift line cooperating such that the natural period apparent to the work package is at least four times the average wave period acting on the surface vessel whereby the position of the work package may be directly manipulated by the surface vessel, yet remain substantially unaffected by the dynamic effects of heave, surge and sway on the surface vessel.

8. A heave compensating support system in accordance with claim 7 wherein the recovery cable is at least four times the length of the lift line.

9. A heave compensating support system in accordance with claim 8 wherein the subsurface buoy is formed from syntactic foam.

10. A heave compensating support system for positioning subsea work packages from a surface vessel interacting with waves having an average height and frequency, said system comprising:

a subsurface buoy;

a lift line connecting the subsea work package to the subsurface buoy;

a compensating lift line supported by the subsurface buoy on one end and connected to the surface vessel on the other end, comprising:

a chain forming a catenary loop below the subsurface buoy having a loop length which is at least three times the average wave height; and a recovery cable connecting the chain to a winch on the surface vessel, said recovery cable being at least four times as long as the lift line;

wherein the subsea work package, subsurface buoy, lift line and compensating lift line satisfy the following relation;

$$\frac{M_1 + M_2}{K} > 0.4 \, T_w^2$$

where:

K is the submerged weight/unit length of the recovery cable;

$M_1$ is the mass of the submerged buoy $+\frac{1}{3}$ times the mass of the compensating lift line; and $M_2$ is the mass of the subsea work package $+\frac{1}{3}$ times the mass of the lift line; and $T_w$ is the significant wave period;

whereby the natural frequency apparent to the work package substantially differs from the average wave frequency acting on the surface vessel such that the position of the work package is subject to direct manipulation by the surface vessel, but is substantially isolated from the effects of heave on the surface vessel.

11. A method for positioning a subsea work package at a desired deepwater offshore location comprising:

suspending the subsea work package on a lift line attached to a subsurface buoy suspended below the wave zone;

securing the subsea work package to a surface vessel through a compensating lift line having one end connected to control equipment on the surface vessel and the other end connected to the subsurface buoy through a catenary loop having a height substantially in excess of the average wave height at the surface; and selecting the subsea work package, subsurface buoy, lift line, and compensating lift line to form a combined heave compensating support system in which the natural frequency apparent to the work package substantially differs from the average wave frequency acting on the surface vessel such that the position of the subsea work package is subject to direct manipulation from the surface vessel, but is substantially isolated from the effects of heave on the surface vessel.

12. A method for positioning a subsea work package at a desired location in deepwater offshore, comprising:

suspending the subsea work package on a lift line attached to a subsurface buoy suspended below the wave zone;

securing the subsea work package to a surface vessel through a compensating lift line having one end connected to control equipment on the surface vessel and the other end supported by the subsurface buoy;

isolating the subsea work package from the heave displacement experienced by the surface vessel and transmitted to the compensating lift line by providing a catenary loop in the compensating lift line below the subsurface buoy; and isolating the subsea work package from indirect effects of heave, surge and sway on the surface vessel transmitted through the compensating lift line by establishing an apparent natural frequency on the subsea work package which substantially differs from the average wave frequency acting on the surface vessel.

13. A method for positioning a subsea work package in accordance with claim 12, further comprising:

lowering the subsea work package to a desired location by running the compensating lift line from the control equipment on the surface vessel.

14. A method for positioning a subsea work package in accordance with claim 12, further comprising:

deploying the subsea work package in the desired location, comprising:

adding ballast to the subsurface buoy equal to the weight of the subsea work package to be deployed and left behind;

releasing the subsea work package; and retrieving the subsurface buoy, compensating lift line and ballast.

15. A method for positioning a subsea work package in accordance with claim 14, wherein adding ballast comprises venting the subsurface buoy to take on water.

16. A method for positioning a subsea work package in accordance with claim 14 wherein adding ballast comprises paying out the compensating lift line to increase the length of the catenary loop.

17. A method for positioning a subsea work package in accordance with claim 14 wherein adding ballast comprises attaching a clump weight to the subsurface buoy.

18. A method for retrieving a subsea work package from a desired location in deep water offshore, comprising:
providing a subsurface buoy suspended below the wave zone;
providing ballast to the subsurface buoy equal to the weight of the subsea work package to be retrieved;
securing the subsurface buoy to a surface vessel through a compensating lift line having one end connected to control equipment on the surface vessel and the other end supported by the subsurface buoy;
isolating the subsurface buoy from the heave displacement experienced by the surface vessel and transmitted to the compensating lift line by providing a catenary loop in the compensating lift line below the subsurface buoy;
isolating the subsurface buoy from indirect effects of heave on the surface vessel transmitted through the compensating lift line by establishing an apparent natural frequency on the subsurface buoy and ballast which substantially differs from the average wave frequency acting on the surface vessel;
lowering the subsea work package to a desired location by running the compensating lift line from the control equipment on the surface vessel;
attaching the subsea work package to the subsurface buoy through a lift line;
removing the ballast from the subsurface buoy; and
retrieving the subsurface buoy, lift line, subsea work package, and compensating lift line to the surface vessel.

* * * * *